(No Model.)
N. S. ABRAHAMSON.
FLUME GATE.
No. 540,568. Patented June 4, 1895.
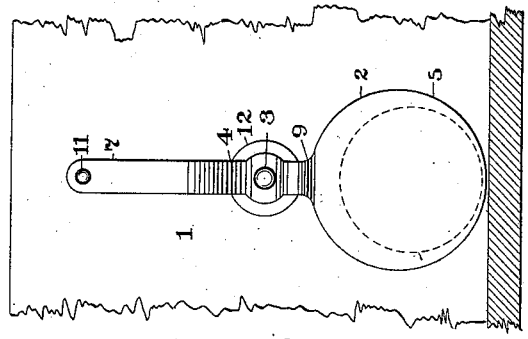
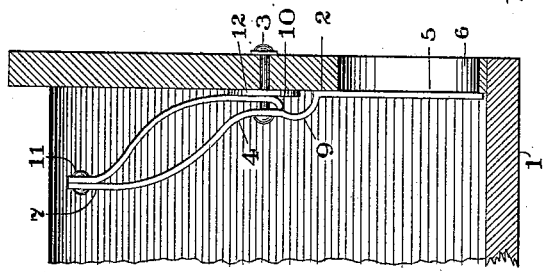
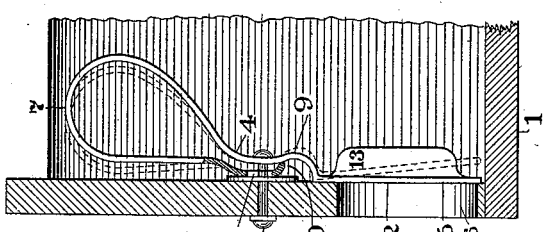
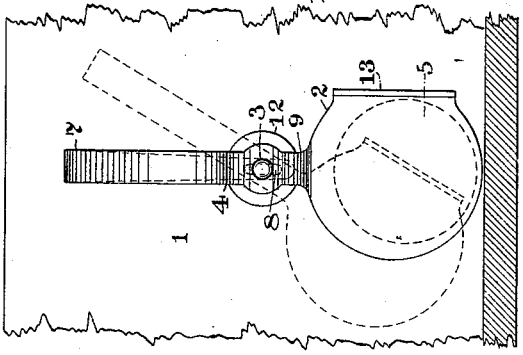
WITNESSES:
INVENTOR
N. S. Abrahamson
BY
ATTORNEYS

UNITED STATES PATENT OFFICE.

NELS S. ABRAHAMSON, OF REDLANDS, CALIFORNIA.

FLUME-GATE.

SPECIFICATION forming part of Letters Patent No. 540,568, dated June 4, 1895.

Application filed August 10, 1894. Serial No. 519,980. (No model.)

*To all whom it may concern:*

Be it known that I, NELS S. ABRAHAMSON, of Redlands, in the county of San Bernardino and State of California, have invented certain new and useful Improvements in Flume-Gates, of which the following is a full, clear, and exact description, reference being had to the accompanying drawings, which form a part of this specification.

My invention relates to certain new and useful improvements in flume gates for irrigating purposes and my invention consists in certain features of novelty hereinafter described and pointed out in the claims.

Figure I represents a front elevation of my improved gate attached to the inner side of a flume. Fig. II represents a side elevation. Fig. III represents a side elevation of the gate in a modified form. Fig. IV represents a front view of the modification.

Referring to the drawings, 1 represents a section of a flume to which the gate 2 is secured by means of a pivotal bolt or rivet 3 which passes through the shank 4 of the gate. 5 represents the valve of the gate which is preferably formed of a circular flat portion of metal which corresponds to but is somewhat larger in diameter than the orifice 6 in the side of the flume which it covers when in its normal position, but which on being moved to either side permits the water to flow through the orifice to a greater or less degree according to the amount of the orifice uncovered.

The shank 4 is extended to form a spring handle 7 in the shape of a loop, the end of the same having a slot 8 through which the bolt 3 passes. Forward of the bolt 3 the shank is formed into an arch 9 thus forming an auxiliary spring which serves to hold the valve in close contact with that portion of the flume immediately surrounding the orifice 6 in order to make it water tight. The end of the shank is upturned at 10 which serves as a fulcrum to the body of the shank when opening or closing the valve.

In Figs. III and IV, I have made the main spring portion of the shank elliptical in form, the shank being made in two parts and joined at its rear end by means of a rivet 11, this form of spring enabling me to use up small pieces of material that would otherwise be wasted.

12 represents a washer placed between the shank and the side of the flume.

In operating the valve the spring handle is slightly compressed as shown in dotted lines Fig. II. The main portion of the shank bearing against the fulcrum 10 causes the valve 5 to recede from the side of the flume, in which position it is easily moved to either side in order to let the water flow through the orifice 6. The end of the shank being slotted permits the same to travel slightly forward as the spring is compressed.

My gate is preferably attached to the inner side of the flume but I do not confine myself to so attaching it.

Where the flume is laid on a steep grade, the tendency of the water to flow in a straight course, will prevent as great a quantity of water from passing through the orifice 6, as where the flume is laid on a level surface. To obviate the above mentioned difficulty, I provide certain of my gates with an upturned deflecting flange 13, which gates may be placed in the flume where it runs on an incline, said flange retarding and directing the water through the orifice in the side of the flume when the gates are opened.

I claim as my invention—

1. A flume gate adapted to be pivoted to the side of a flume having a deflecting flange and means for holding the gate at any point in the path it describes, substantially as described and for the purpose set forth.

2. In a flume gate, the combination of a valve, a spring shank formed into a loop, and having a pivotal bolt passing through the body and end of the shank, substantially as described and for the purpose set forth.

3. In a flume gate, the combination of a valve and a spring shank formed into a loop, said shank being provided with a slot near its end, substantially as described and for the purpose set forth.

4. In a flume gate the combination of a valve and a spring shank formed into a loop, said shank having its end upturned and forming a fulcrum for the body of the shank, substantially as described and for the purpose set forth.

NELS S. ABRAHAMSON.

Witnesses:
W. T. PRINE,
CHAS. E. TRUESDELL.